Patented Sept. 26, 1939

2,174,164

UNITED STATES PATENT OFFICE 2,174,164

PLASTIC COMPOUND

Silvio Pellerano, Brooklyn, N. Y.

No Drawing. Application March 1, 1937,
Serial No. 128,493

6 Claims. (Cl. 260—28)

The object of this invention is a plastic compound or cement for general use as such, or as a binding material, putty or a sealing compound where the use of such a compound is indicated, more particularly to a compound adapted to act efficiently for sealing ducts or conduits such as are used for leading electric cables and wires underground and consists in the combination and treatments herein described.

Usually in underground construction, electrical cables or wires are led through conduits which connect through a series of manholes and to various outlets or units of construction. It is essential that water and moisture be kept from entering the conduits. A present means of closing this is to pack the end of the cable containing conduit or duct with oakum on the surface of which plaster of Paris or Portland cement is applied to form a tight seal and to act as a barrier to the entrance of any water which might have accumulated in the manholes. This construction involves considerable work when repairing or removing the wires due to the necessity of chiseling off the cement (or plaster of Paris) which often leads to damage to the cable. A compound is desirable which will replace this cement or plaster of Paris and which at the same time may be easily removed whenever the occasion requires.

A number of such compounds has heretofore been prepared but the present invention is a decided improvement over any of them. The purpose of this invention is to prepare a cement which will adhere to any of the materials from which ducts or conduits are made, whether of asbestos-cement, glazed clay, fibre or wood or any mixture thereof. Such a compound should remain workable through any changes of atmospheric conditions so that no chiseling is required. This compound must be highly waterproof and should be a dielectric. It is highly desirable that such compounds be non-corrosive and have no action on rubber, lead, cloth or any material from which cables are manufactured. It is also desirable that this compound should be flameproof and should be tenacious and not possess coldflow properties. My invention also comprises the method whereby I treat the various ingredients in producing the plastic compound and the steps taken in my process. With this and other objects in view, my invention will be described. The following is a description, it being understood that my method and formula contemplate equivalent quantities when available and suitable for use whenever used in the form set forth.

In preparing the compound I prefer to use the ingredients in the following proportions, viz.:

2 to 6 parts viscous coumarone-indene resin blended with 1 to 3 parts chlorinated paraffin and thoroughly mixed until a homogeneous mass is obtained. This is then incorporated with 1 to 5 parts asbestos fibres and 2 to 10 parts powdered soapstone in a suitable mixing machine until a plastic compound is obtained. Other mineral fillers may be used such as diatomaceous earth, whiting, clay or any such material. In presenting the above I do not wish to be limited to the exact proportions stated in the specification as the proportions (by weight) may be changed considerably in order to produce a compound having the advantageous properties described heretofore. No specific coumarone-indene resin and no specific chlorinated paraffin is mentioned; it being intended that these specifications are understood to cover any similar results. Any of the hard grades of coumarone-indene may be used when softened with a heavy solvent plasticizing oil.

A specific example of this compound is as follows:

4 parts viscous coumarone-indene resin having a melting point range of 40–115° F. are blended with 2 parts chlorinated paraffin and thoroughly mixed until a homogeneous mass is obtained. This is then incorporated with 3 parts asbestos fibres and 6 parts powdered soapstone in a suitable mixing or kneading machine until a uniform plastic compound is obtained. The proportions refer to parts by weight.

The above composition has in a marked degree the properties desired for the specific use, being impervious to water, having adhesion to the various surfaces from which conduits are made, being non-corrosive and of uniform consistency over changing climatic conditions, being workable over long periods of time, practically noninflammable and in addition being an insulator of electricity.

I claim:

1. A plastic, adhesive, cold workable non-setting, waterproof, dielectric compound comprising the combination of coumarone-indene resin and chlorinated paraffin together with a heavy solvent plasticizing oil and inert fillers.

2. A plastic, adhesive, cold workable, non-setting, waterproof, dielectric compound comprising by weight approximately 2 to 6 parts of viscous cuomarone-indene, 1 to 3 parts of chlorinated paraffin which are blended and incorporated with 1 to 5 parts of asbestos fibres and 2 to 10 parts of soapstone.

3. A plastic, non-setting, easily workable, waterproof, dielectric compound comprising 4 parts of coumarone-indene resin having a melting point range of 40–115° F., 2 parts of chlorinated paraffin and 3 parts of short asbestos fibres and 6 parts of powdered soapstone.

4. A plastic, non-setting waterproof dielectric composition, comprising a blend of coumarone-indene resin as an essential ingredient with chlorinated paraffin, and inert fillers, said composition possessing adhesive properties and being manually workable under any changes of atmospheric conditions.

5. A plastic, non-setting, waterproof dielectric composition comprising a blend of coumarone-indene resin as an essential ingredient with chlorinated paraffin and with asbestos and soapstone as mineral fillers, said composition retaining its plasticity and being workable under extremes of atmospheric conditions and being flame proof.

6. An adhesive plastic, composition for use in connection with sealing conduits and the like, comprising a viscous coumarone-indene resin as an essential ingredient, a chlorinated paraffin in a quantity one-half that of the resin, and inert fillers in a quantity almost equal that of the resin and paraffin, said composition being easily workable under atmospheric conditions, flame proof and resistant to cold flow.

SILVIO PELLERANO.